March 28, 1961     R. Y. MINER ET AL     2,977,049
TARGET POSITION COMPUTER

Filed June 4, 1953     3 Sheets-Sheet 1

INVENTORS.
Richard Y. Miner
Edmund D. Gittens
Charles H. Bock
Quentin J. Evans

BY Raymond A. Paquin
ATTORNEY.

INVENTORS.
Richard Y. Miner
Edmund D. Gittens
Charles D. Bock
Quentin J. Evans
BY Raymond A. Paquin
ATTORNEY.

INVENTORS.
Richard Y. Miner
Edmund D. Gittens
Charles D. Bock
Quentin J. Evans

BY Raymond A. Paquin
ATTORNEY.

United States Patent Office 2,977,049
Patented Mar. 28, 1961

2,977,049

TARGET POSITION COMPUTER

Richard Y. Miner and Edmund Donald Gittens, Port Washington, Charles D. Bock, Long Island City, and Quentin J. Evans, Floral Park, N.Y., assignors to American Bosch Arma Corporation Filed June 4, 1953, Ser. No. 359,592

4 Claims. (Cl. 235—186)

The present invention relates to ordnance calculating devices and has particular reference to apparatus for continuously determining the position of a moving target vessel.

The instrument receives continuous indications of the speed, course and course curvature of the target vessel, speed and course of the attacking vessel (own ship), and intermittent indications of actual range and bearing of the target and from these values generates a continuous indication of range and bearing.

Provision is made for two modes of operation, namely the "Display-Only" and "Auto-Synchronize" modes. In the former, the received range and bearing signals do not affect the generated solutions and the error between the generated and received values are displayed on error dials. In the "Auto-Synchronize" mode of operation the received range and bearing signals continually correct the generated solutions to the observed values.

An important feature of the instrument is the correction units in which are stored the north and east components of yards lost in the solution as a result of the inability of the instrument to maintain a generating rate as high as required by the indicated values. The stored yards are later released when the indicated rates of change in bearing and range fall to values low enough to allow the generating motors to accept the stored yards and to thereby correct the indicated solutions.

For a better understanding of the function and operation of the invention reference may be had to the accompanying diagrams, in which Fig. 1 shows the geometry of the problem and its proposed solution;

Figure 1:
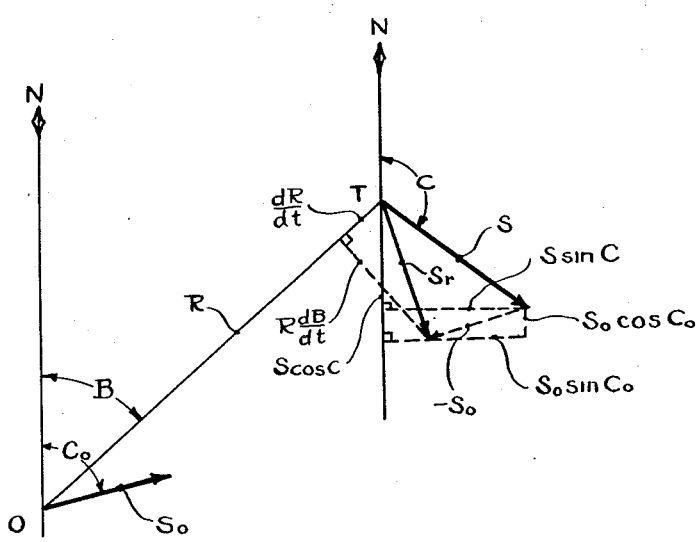

With reference to Fig. 1 the attacking vessel or own ship, shown at O, is proceeding along a course Co with a speed So. The target ship, shown at T, is proceeding along a course C at a speed S. T is at a range R from O, while the angle between the north-south azimuth and the line-of-sight to the target, or bearing angle, is B. The relative speed of the target is Sr, and the components of Sr along the line of sight and perpendicular to the line of sight are respectively equal to the rate of change of range, $$\frac{dR}{dt}$$

and the range multiplied by the rate of change of bearing, $$\frac{RdB}{dt}$$

Also, the relative speed north, Srn, is equal to the target speed north minus own speed north or $S_{rn} = S \cos C - So \cos Co$, and similarly the relative speed east, $S_{re}$, is equal to the target speed east minus own speed east or $S_{re} = S \sin C - So \sin Co$. Using these relationships the present invention continuously solves for instantaneous values of R and B from intermittent or initial inputs of R, relative bearing Br, S, C, Q (the curvature of the target path) and continuous inputs of So and Co. The curvature of the target track Q, represents the turn of the target per yard of target travel.

Figure 2:
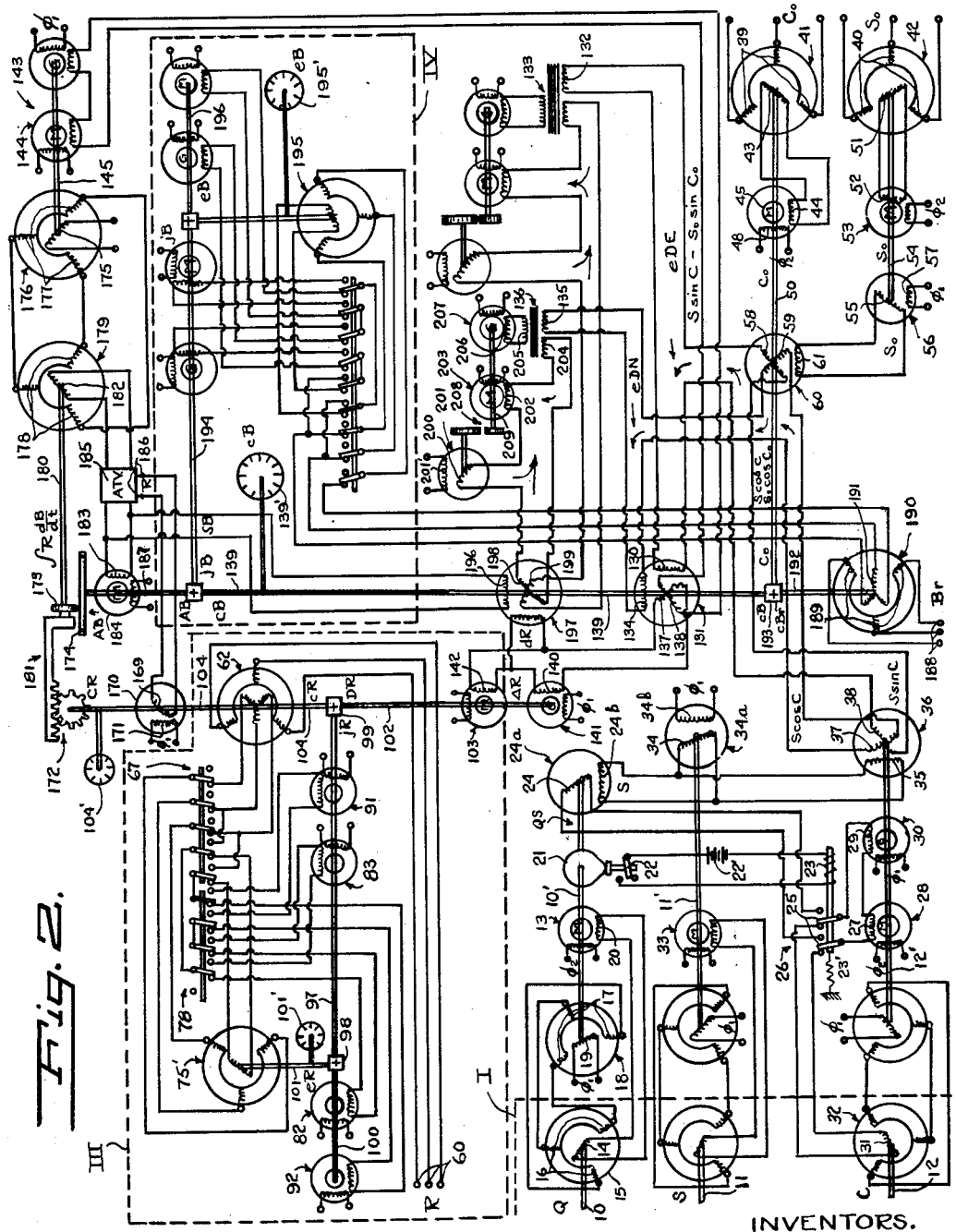
Fig. 2 is a schematic wiring diagram of the calculating apparatus.
Figure 3:
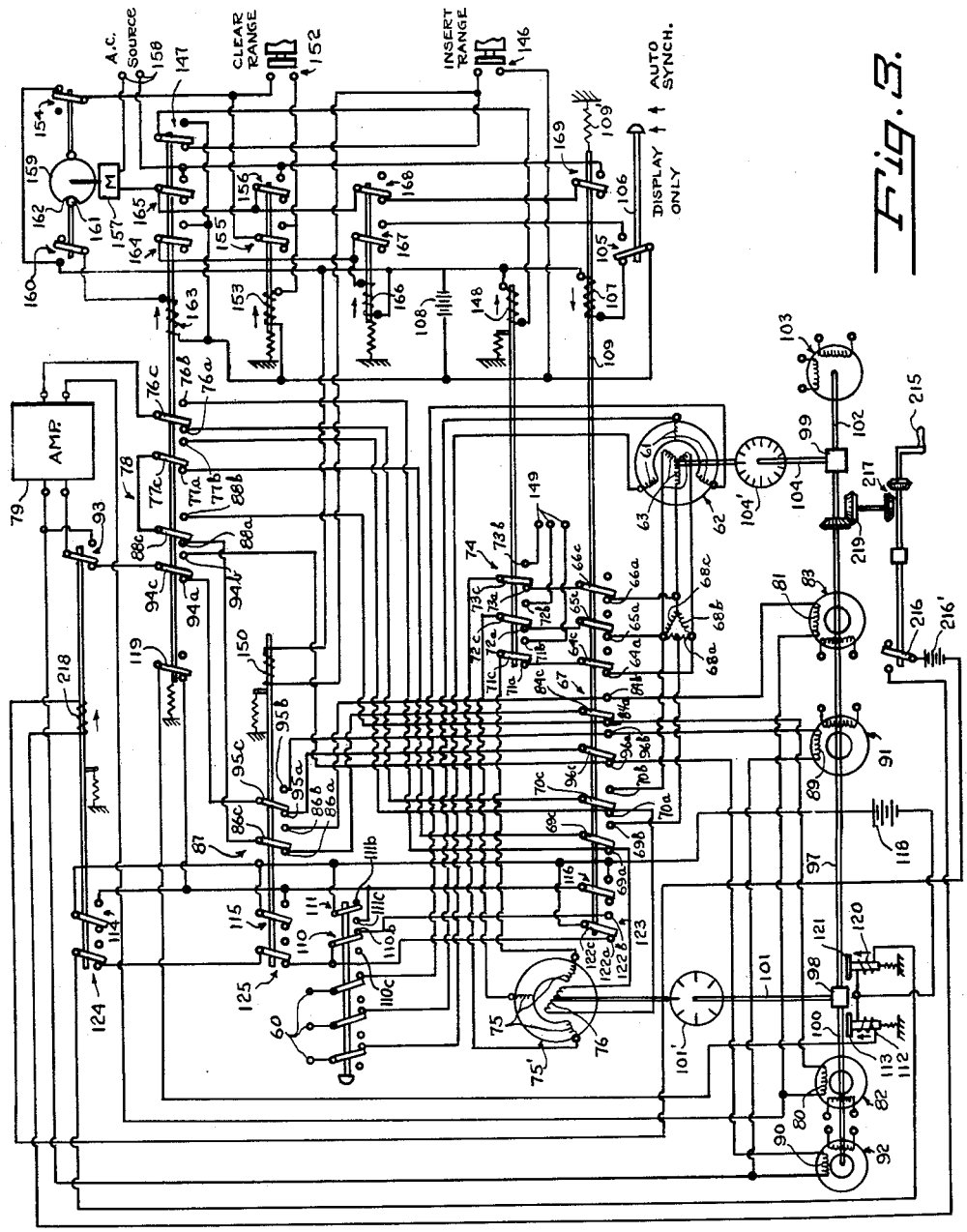
Fig. 3 is a more complete schematic wiring diagram of one part of the circuit of Fig. 2.

With reference to the schematic wiring diagrams Figures 2 and 3, only the components necessary to an understanding of the invention are shown. It is well known that successful operation of circuits of the type shown demands use of amplifiers, phase shifting networks, filters and damping devices for example. In the interest of simplicity most of these items have been omitted from the diagrams, which show some of the damping generators, however, but anyone skilled in the art will be familiar with their necessity and operation. It will be understood that the motors and generators are preferably of the two phase induction type and that phase one $\phi_1$ of an alternating voltage two phase supply energizes the main field windings of the generators and phase two $\phi_2$ of the voltage supply energizes the main field windings of the motors although this may not always be specifically pointed out in the matter to follow. The signal voltages applied to the control fields of the motors are of course understood to be in quadrature with the main field excitation.

The arrows on the diagrams indicate the direction of actuation of the relay armatures upon energization of the relay windings. The armatures are urged opposite to the arrows by the restoring springs whenever the relay windings are deenergized.

Referring now to Fig. 2 shafts 10, 11, 12 are displaced according to the values of Q, S and C by means of calculating equipment not described here but which may be of the type disclosed in copending application Serial No. 170,846 filed June 28, 1950, for Electromechanical Computing Apparatus, for example. Since the shafts 10, 11, 12 may be remotely located with respect to the present instrument shaft 10' is driven by motor 13 and is displaced from its zero position by an amount corresponding to the displacement of shaft 10, as will be described. Shaft 10 drives the rotor winding 14 of self synchronous control transformer 15 the stator windings 16 of which are energized by the output of the stator windings 17 of self synchronous transmitter 18. The rotor or primary winding 19 of transmitter 18 is energized by a constant alternating voltage of phase 1 of a two phase supply and is driven by shaft 10'. The rotor winding 14 of control transformer 15 is connected to the control field winding 20 of motor 13, the main field winding of which is energized by phase 2 of the alternating voltage supply. Motor 13 therefore drives the rotor winding 19 until the positional signal voltages at stator windings 16 correspond to the position of the rotor winding 14 so that the voltage induced in rotor winding 14 is zero and motor 13 is deenergized. In this condition, the displacement of shaft 10' corresponds to the displacement of shaft 10, or is proportional to Q, the curvature of the target path.

Shaft 10' also drives the cam 21 which operates switch 22. Whenever the value of Q is zero, switch 22 is opened, thereby interrupting the circuit from power supply 22' through relay winding 23 and allowing spring 23' to urge the movable contacts 25 of switch 26 to the left, as shown in Fig. 2. In this position, the control field winding 27 of motor 28 and the output field winding 29 of generator 30 are connected in series with the rotor winding 31 of control transformer 32. In a manner similar to the operation of motor 13 in driving shaft 10', motor 28 drives shaft 12' into the position where the displacement of shaft 12' corresponds to C, the course of the target. The generator 30 in this circuit aids in damping the operation of motor 28.

Also in a similar manner, motor 33 drives shaft 11' into correspondence with shaft 11, so that the displacement of shaft 11' from its zero position is proportional to S, the speed of the target. Shaft 11' drives the secondary winding 34 of induction potentiometer 34a, the primary winding 34b of which is energized by phase 1 so that the voltage output of secondary winding 34 is proportional in magnitude to S. The output of rotor winding 34 energizes the stator winding 24b of induction potentiometer 24a, the rotor winding 24, of which is connected to the right hand stationary terminals of switch 26 and is driven by shaft 10'. Whenever the value of Q, the curvature of the target path, is other than zero, a voltage proportional in magnitude to QS, which is equal to the rate of change of target course $$\frac{dC}{dt}$$

is induced in rotor winding 24. Displacement of shaft 10' from the zero position also closes switch 22 to energize relay winding 23 and to thereby draw the movable contacts 25 to the right in Fig. 2. Motor 28 and generator 30 comprise an integrating device in which the speed of shaft 12' is proportional to the QS signal from rotor winding 24, and the change in displacement of shaft 12' is proportional to $\int QS$ or the change in target course $\Delta C$. Thus, the total angular displacement of shaft 12' from the zero position is equal to the sum of the displacement just prior to closure of switch 22, C, and the change in displacement due to the $$\frac{dC}{dt}$$

voltage or is proportional to $C \pm \Delta C$, the instantaneous course of the target.

Therefore, the position of shaft 12' correspods to the target course for either straight or curved course travel of the target.

The output of rotor or secondary winding 34 also energizes the stator winding 35 of electro-mechanical resolver 36, the secondary or rotor windings 37, 38 of which are displaced according to C by the shaft 12', so that the voltage output of secondary winding 37 is proportional in magnitude to $S \cos C$ and the voltage of secondary winding 38 is proportional in magnitude to $S \sin C$.

Signals corresponding to Co and So, own ship course and speed are received at the stator windings 39 and 40 of the control transformers 41 and 42 repectively from own ships compass and log, not described here. The rotor winding 43 of transformer 41 is connected to control field winding 44 of motor 45 while the main field winding 48 of the motor is energized by $\phi_2$. Motor 45 therefore drives shaft 50 and rotor winding 43 until the voltage induced in rotor winding 43 is zero and the position of shaft 50 corresponds to Co, the course of own ship.

Rotor winding 51 of transformer 42 is connected to the control field winding 52 of rotor 53, the main field winding of which is energized by $\phi_2$ so that motor 53 drives rotor winding 51 into the non-inductive position whence motor 53 is deenergized and the displacement of of shaft 54 is proportional to So. Shaft 54 also drives the rotor or secondary winding 55 of induction potentiometer 56, the primary winding 57 of which is energized by $\phi_1$ so that the output voltage of rotor winding 55 is proportional in magnitude to So. The primary or stator winding 61 of resolver 60 is energized by the So output voltage of potentiometer 56 and the rotor of resolver 60 is driven by shaft 50. Thus the output voltage of secondary winding 58 is proportional in magnitude to $So \sin Co$ and the output voltage of secondary winding 59 is proportional in magnitude to $So \cos Co$.

Rotor winding 58 of resolver 60 is connected in series with rotor winding 38 of resolver 36, stator winding 130 of resolver 131 and secondary winding 132 of transformer 133 in a manner such that the magnitude of the voltage applied to stator winding 130 is the algebraic difference between the magnitude of the output voltage of rotor winding 38 and the algebraic sum of the magnitudes of the output voltages of rotor winding 58 and secondary winding 132. The output voltage of secondary winding 132 is designated as $eD_E$, the significance of which will be explained later, and may for the present be assumed to be equal to zero. Then the voltage energizing stator winding 130 is seen to be proportional in magnitude to $S \sin C - So \sin Co$. Similarly rotor winding 59 of resolver 60 is connected in series with rotor winding 37 of resolver 36, stator winding 134 of resolver 131 and secondary winding 135 of transformer 136 so that the voltage energizing stator winding 134 is proportional in magnitude to $S \cos C - So \cos Co$ when the $eD_N$ output voltage of secondary winding 135 is equal to zero. The rotor windings 137 and 138 of resolver 131 are driven by shaft 139, the displacement of which will be merely designated at present as $cB$ (corresponding to a calculated value of bearing angle B) and will be demonstrated later to be equal to $cB$.

A signal corresponding to the initial range R, of the target is supplied to terminals 60 from range detecting equipment located elsewhere on the vessel. The stator windings 61 of self-synchronous differential 62 are energized by the voltage at terminals 60, and the rotor windings 63 of differential 62 are connected to the left hand stationary contacts 64a, 65a, 66a of multiple pole switch 67. Also connected across the rotor windings 63 are three similar resistors 68a, 68b and 68c, the voltage across a portion of one of which, resistor 68a for example is applied to the right hand stationary contacts 69b and 70b of switch 67. The resistor 68a therefore acts as a voltage divider while resistors 68b and 68c are required to balance the load on rotor windings 63 of differential 62. The movable contacts 64c, 65c and 66c of switches 67 are connected to the left hand stationary contacts 71a, 72a and 73a of switch 74, the respective movable contacts 71c, 72c and 73c of which are connected to the stator windings 75 of self-synchronous control transformer 75'. The rotor winding 76 of control transformer 75' is connected to the left hand stationary contacts 69a, and 70a of switch 67.

The left hand stationary contacts 69a and 70a are respectively connected to the right hand stationary contacts 76b and 77b of switch 78 while the movable contacts 69c and 70c of switch 67 are connected to the left hand stationary contacts 77a and 76a respectively of switch 78.

Movable contact 76c is connected to one input terminal of amplifier 79, the other input terminal of which is connected to the common side of the output windings 80 and 81 of generators 82 and 83 respectively. The other side of output winding 80 is connected to the left hand stationary contact 84a of switch 67 and to the right hand stationary contact 88b of switch 78 while the other side of output winding 81 is connected to the right hand stationary contacts 84b and 86b of switches 67 and 87 respectively. The left hand stationary contact 88a of switch 78 is connected to the movable contact 86c of switch 87, and the left hand stationary contact 86a of switch 87 is connected to the movable contact 84c of switch 67. Movable contact 77c is connected to the movable contact 88c, and it will be seen that the voltage input to amplifier 79 is the algebraic difference between the voltage at movable contacts 76c and 77c and the output voltage of either generator 82 or 83 as determined by the relative positions of switches 67, 78 and 87 as will become clear during later description.

One of the output terminals of amplifier 79 is connected to the common side of the control field windings 89 and 90 of motors 91 and 92 respectively. The other output terminal of amplifier 79 is connected, through switch 93 to the movable contact 94c of switch 78. The left hand stationary contact 94a of switch 78 is connected to the movable contact 95c of switch 87 while the right hand stationary contact 95b of switch 78 is connected to the left hand stationary contact 96a of switch 67 and to the control field winding 90 of motor 92. The right hand stationary contact 95b of switch 87 is connected to the right hand stationary contact 96b of switch 67 and to the control field winding 89 of motor 91, while the left hand stationary contact 95a of switch 87 is connected to the movable contact 96c of switch 67. Thus, the output of amplifier 79 is applied to either motor 91 or 92 as dictated by the relative positions of switches 67, 78 and 87, as will be described later.

Motor 91 drives shaft 97 which drives the rotor of generator 83 and is also one input to each of mechanical differentials 98 and 99. Motor 92 drives shaft 100 which drives the rotor of generator 83 and is the other input to differential 98. The output shaft 101 of differential 98 drives the rotor winding 76 of control transformer 75′, the displacement of shaft 101 being equal to the difference between the displacement of shafts 97 and 100.

The other input shaft 102 of differential 99 is driven by motor 103, as previously described and the output shaft 104 of differential 99 displaces the rotor winding 63 of self synchronous differential 62 by an amount proportional to the difference between the displacements of shafts 97 and 102.

Either of two conditions of operation of the circuit of Fig. 3 may be chosen by manual actuation of switch 105 to the left or to the right, which conditions correspond respectively to the "display only" or the "auto-synchronize" modes as indicated near the end of handle 106 of switch 105. In the "display only" condition the difference between the generated range, i.e., the range computed by the instrument, and the observed range is displayed on dial 101′ which is driven by shaft 101. In the "auto-synchronize" condition, the observed range is set into the instrument and the difference is displayed simultaneously.

Setting the instrument in the "display only" condition closes switch 105 to the left thereby energizing relay winding 107 from supply 108, causing the armature 109 to be urged to the left against the action of spring 109′, thus operating all of the movable contacts of switch 67 into cooperation with their left hand stationary contacts. The operator of the instrument then actuates switches 110 and 111 so that the movable contacts 110c and 111c cooperate with the right hand stationary contacts 110b and 111b respectively. Although the control of switches 110, 111 is shown as manual, relay operated switches may be used if desired. Opening of switch 111 causes the brake winding 112 to be deenergized thereby releasing the brake 113 from shaft 100. This can be seen by noting that switches 111, 114, 115 and 116 are all connected in parallel between the positive lead 117 from power supply 118 and one side of brake winding 112 (through switch 119) while the other side of the brake winding 112 is connected to the negative lead of power supply 118. Since switches 114, 115 and 116 are open and switch 119 is closed, the energization of the brake winding 112 is controlled by switch 111.

The circuit through brake winding 120 is from power supply 118 through movable contact 122c of switch 123 left hand stationary contact 122a, switches 125 and 124, brake winding 120 and back to power supply 118, and since switch 110 is connected across stationary contacts 122a, 122b of switch 123 the brake winding 120 remains energized for either position of switch 110 whence brake 121 is urged against shaft 97 to prevent rotation of shaft 97. It should be noted that movable contacts 116c and 122c are operated by the armature 109 and are therefore urged to the left only during the "display only" operation of the instrument.

The output voltages of rotor windings 137 and 138 are therefore proportional in magnitude to $(S \cos C - So \cos Co) \cos cB - (S \sin C - So \sin Co) \sin cB$ (1)

and $(S \cos C - So \cos Co) \sin cB + (S \sin C - So \sin Co) \cos cB$ (2)

respectively.

Referring now to Fig. 1, it will be seen that when cB is equal to B, the output voltage of rotor winding 137 is proportional to $$\frac{dR}{dt}$$

and the output voltage of rotor winding 138 is proportional to $$\frac{RdB}{dt}$$

Recognizing that the displacement of shaft 139 is proportional to a calculated angle cB rather than the actual angle B, the respective outputs of rotor windings 137 and 138 will be correspondingly designated as $$\frac{cdR}{dt}$$

and $$\frac{cRdB}{dt}$$

The prefixed "c" in the remaining description is intended to denote calculated values of the quantity following the "c."

Rotor winding 137 is connected in series with the output field winding 140 of generator 141 and with the control field winding 142 of motor 103 in a manner such that the voltage energizing the control field winding 142 is the algebraic difference between the outputs of rotor winding 137 and the output field winding 140. Motor 103 drives the rotor of generator 141 at a speed such that the voltage induced in output winding 140 is very nearly equal to the output of rotor winding 137 whence the speed of shaft 102, driven by motor 103, is proportional to the magnitude of the output voltage of rotor winding 137

$$c\frac{dR}{dt}$$

and the displacement of shaft 102 in an interval of time $\Delta t$ is proportional to $$\rho c \frac{dR}{dt}$$

or $c\Delta R$.

Similarly, the voltage output of rotor winding 138 energizes a motor-generator set 143, the motor 144 of which drives shaft 145 at a speed proportional to the magnitude of the output voltage of rotor winding 138, $$cR\frac{dB}{dt}$$

and the displacement of shaft 145 in an interval of time $\Delta t$ is proportional to $$\int cR\frac{dB}{dt}$$

or $cR\Delta B$.

Refer now to Fig. 3, which is a more complete schematic diagram of that part of the circuit shown in Fig. 2 which is enclosed within the dotted rectangle III.

In the "display only" condition of operation motor 103 drives shaft 102, and through differential 99 drives shaft 104 at a proportional speed (since the brake 121 holds shaft 97 stationary) so that the speed of shaft 104 is proportional to the calculated rate of change of range $$c\frac{dR}{dt}$$

If the initial position of shaft 104 corresponds to the initial range then the position of shaft 104 continues to correspond to the target range. (It will be shown later that the initial position of shaft 104 corresponds to initial range.) The range signal input to terminals 60 is intermittent so that the positional signals induced in the rotor windings 63 correspond to the difference between the calculated range $cR$, read on dial 104' and the last reading of the range received at terminals 60. This error signal is applied to the stator windings 75 of control transformer 75' and the output voltage of rotor winding 76 energizes the motor 92, jointly with the output of generator 82, through the switching means previously described. Motor 92 therefore drives the rotor winding 76 to the non-inductive position, whence the displacement of shaft 101 is proportional to $cR$ the error in the range reading of dial 104' and the range indicated by the signal at terminals 60.

By depressing the "insert range" control button 146 the $eR$ value at dial 101' may be used to displace shaft 104 accordingly, to return dial 101' to zero and to thereby modify the $cR$ indication of shaft 104 by a like amount. Pressing the button 146 completes the circuit from power supply 108 through switch 147 and relay winding 148 to energize the relay winding 148 and cause the relay to operate switch 74 so that the movable contacts 71c, 72c, 73c cooperate with the right hand stationary contacts 71b, 72b, and 73b respectively. Operation of switch 74 to the right applies an "electrical zero" signal to the stator windings 75 of control transformer 75' from the terminals 149. Depression of the button 146 also causes energization of the relay winding 150 from power supply 108 thereby operating the movable contacts of switches 125, 115 and 87 to the right to respectively do the following: deenergize brake winding 120 to remove brake 121 from shaft 97; energize brake winding 112 to apply brake 113 to shaft 100; as hereinafter described, switch 87 places the motor 91 under control of control transformer 75' and simultaneously removes motor 92 from control of the control transformer 75'.

Motor 91 then drives the shaft 101 through differential 98 to return the rotor winding 76 to the non-inductive position and the dial 101' to zero and simultaneously drives shaft 104 by a corresponding amount to correct the range indication on dial 104'.

The error dial 101' may be set to zero without disturbing the range shaft 104 by depressing the clear range button 152. Depression of button 152 energizes relay winding 153 from power supply 108 through normally closed switch 154 so that relay winding 153 operates the movable contacts of switches 155, 156 to the right in Fig. 3. Closure of switch 155 maintains the circuit through relay 153 even though the button 152 is released, while closure of switch 156 energizes motor 157 from the alternating voltage supply 158 which begins to drive the notched disc 159. Rotation of disc 159 causes switch 160 to close as the roller 161 is driven out of notch 162 thereby energizing relay winding 163 from power supply 108. Energization of relay winding 163 actuates the movable contacts of switches 78, 119, 147 and 164 and 165 to the right in Fig. 3 to the effect the following: Switch 147 energizes relay winding 148 to apply the electrical zero to control transformer 75'; switch 164 energizes relay winding 166 to operate switches 167, 168 to the right although this action is not important with the instrument in the "display only" condition; switch 78 chooses the motor 92 and generator 82 to be controlled by the control transformer 75 and switch 119 positively deenergizes relay winding 112 to release brake 113 from shaft 100. When the movable contacts 76c and 77c of switch 78 are urged to the left to cooperate with the stationary contacts 76a and 77a the polarity (or phase) of the voltage at movable contacts 76c, 77c is opposite to that at the movable contacts when the movable contacts are urged to the right to cooperate with the stationary contacts 76b and 77b, since the movable contacts 69c and 70c are urged to the left. Thus, the motor 92 drives rotor winding 76 to the non-inductive position where the error indication on dial 101' is zero, since the signal at windings 75 is the electrical zero from terminals 149. Switch 165 parallels switch 156 so that when disc 159 allows switch 154 to open and deenergizes relay winding 153, the motor 157 remains energized through switch 165 to continue to drive the disc 150 to the initial position, where relay winding 163 becomes deenergized to return the switches 119, 78, 164, 165, 147 to the position shown in Fig. 3.

To put the instrument in the "auto synchronize" condition switch handle 106 is drawn to the right to close switch 105 to the right, thereby deenergizing relay winding 107 and allowing spring 109' to draw the armature bar 109 to the right. Closure of switch 169 by operation of the armature 109 energizes the motor 157 through the series connected switches 169 and 168, initiating the "clear range" cycle previously described. Now, however, actuation of switches 167 and 168 become important. Closure of switch 167 completes an alternate path to maintain relay winding 166 energized so that switch 168 remains open at the end of the "clear range" cycle and the cycle does not keep repeating. Thus the "error in range" dial 101' is automatically returned to the zero position when the instrument is put into the "auto synchronize" condition.

It will be seen that the movable contacts of switches 67, 116, 123 are also urged to the right by armature 109, producing the following effects after the "clear range cycle" is completed: The signal across movable contacts 76c, 77c of switch 78 is the voltage across one portion of resistor 68a and the motor 91 is energized by the output of amplifier 79 to drive the shaft 104 and thereby drive the rotor winding 63 to the position where the voltage energizing motor 91 is zero whence the displacement of shaft 104 corresponds to the value of range at terminals 60. In this operation the differential 62 is used as a control transformer. Motor 91 simultaneously drives shaft 101 by an amount corresponding to the displacement of shaft 104 from its previous position and in order to display the correct value of range difference at dial 101', the dial must be reset to zero by depressing "clear range" button 152 before each new observation of range. When no further observations of range are forthcoming or between observations of range the terminals 60 are disconnected from the stator windings 61 and the brakes 113 and 121 are applied to shaft 100 and 97 respectively by operation of the switches 60', 110 and 111 to the left. Shaft 104 is then driven by motor 103 alone so that the displacement of shaft 104 at anytime corresponds to the calculated range, $cR$.

It is seen therefore that the position of shaft 104 always corresponds to the range of the target vessel. Returning now to Fig. 2, shaft 104 drives the rotor winding 169 of induction potentiometer 170, the primary winding 171 of which is energized by phase 1 of the A.C. supply, so that the voltage output of rotor winding 169 is proportional in magnitude to $cR$, the calculated range. Shaft 104 also drives the gear and rack mechanism 172 which is employed to displace the roller 173 along a radius of the disc 174 by an amount proportional to $cR$.

It has been previously shown that motor 144 drives shaft 145 at a speed proportional to $$cR\frac{dB}{dt}$$

Shaft 145 also drives the rotor winding 175 of self synchronous transmitter 176 the stator windings 177 of which are connected to the stator windings 178 of self-synchronous control transformer 179. The output shaft 180 of integrator 181 is driven by roller 173 and drives the rotor winding 182 of control transformer 179. The output voltage of rotor winding 182 is applied to the control field winding 183 of motor 184 through the vacuum tube attenuator 185. A vacuum tube attenuator is a variable gain amplifier, the gain of which is roughly inversely proportional to the magnitude of a control voltage, applied in Fig. 2 to terminals 184 and in this application is supplied by rotor winding 169. Thus, motor 184 drives shaft 187 and disc 174 at a speed such that the speed of shaft 180 corresponds to the speed of shaft 145 since motor 184 tends to maintain the rotor winding 182 in the non-inductive position. Since the speed of shaft 145 is proportional to $$cR\frac{dB}{dt}$$

as previously noted, then the speed of shaft 180 is also proportional to $$cR\frac{dB}{dt}$$

and since the displacement of roller 173 is proportional to R, then the speed of disc 174 must be proportional to $$c\frac{dB}{dt}$$

Therefore the change in displacement of shaft 187 is proportional to $c\Delta B$, the calculated change in bearing.

A circuit similar to that shown in Fig. 3 is contained within the rectangle IV and is employed to displace shaft 139 according to the actual bearing observation signals received at terminals 188. The signal at terminals 188 is applied to the stator winding 189 of self synchronous differential 190. The rotor windings 191 of the differential 190 are driven by shaft 192, which is the output shaft of differential 193. Shaft 192 is displaced by an amount proportional to the difference between the displacements of the input shafts 139 and 50 of differential 193 or by an amount proportional to $cB-Co$ which is $cBr$. Thus, self synchronous differential 190 corresponds to differential 62, shaft 139 corresponds to shaft 104 and shaft 194 corresponds to shaft 97. Also, the control transformer 195 corresponds to control transformer 75' while shaft 196 corresponds to shaft 100. Thus, means are provided to position shaft 139 in accordance with received signals corresponding to $Br$, i.e. $B-Co=Br$ and when there are no further observations of $Br$ shaft 139 continues to generate $cB$ as it is driven by motor 184.

The significance and instrumentation of the $eDN$ and $eDE$ voltages previously assumed to be equal to zero will be described. In certain maneuvers the conditions may be such that the maximum bearing or range generation by the instrument is not sufficient to keep up with the changes actually taking place between the target and the attacking vessel. For example, when own ship and target ship are heading directly at one another there is no change in bearing until the point where the range reaches zero. Then the bearing must change by 180° instantaneously since the range cannot be a negative quantity. If the maximum bearing rate of motor 184 is assumed to be 45° per second the generation of ranges will be in error by the four seconds required to change the bearing by 180°. Although this exact condition may never be encountered, it is obvious that errors in generation arise whenever motor 185 is incapable of maintaining a speed proportional to the actual bearing rate of change. This deficiency is evidenced by a rise in the voltage energizing motor 184 since the rotor winding 182 of the control transformer 179 cannot be maintained in the non-inductive position.

The stator winding 196 of resolver 197 is energized by the voltage output of the vacuum tube attenuator 185 while the rotor windings 198 and 199 are driven by shaft 139. The rotor winding 198 is connected in series with the rotor winding 200 of induction potentiometer 201, control field winding 202 of motor 203 and secondary winding 204 of transformer 136 the primary winding 205 of which is energized by the output voltage of output winding 206 of generator 207. The primary winding 201' of potentiometer 201 is energized by the constant alternating voltage of $\phi_1$. The voltage energizing control field winding 202 of motor 203 is the algebraic difference between the output of the rotor winding 198 and the sum of voltages of rotor winding 200 and secondary winding 204. Motor 203 drives the rotor of generator 207 and also drives the rotor winding 200 of potentiometer 201 by means of the intermittent drive mechanism 208. The mechanism 208 allows motor 203 to displace the rotor winding 200 proportionally to the displacement of motor shaft 209 for a small angular displacement (on the order of a few degrees) and is disengaged when the displacement of motor shaft 209 increases above that limit so that the displacement of rotor winding 200 remains constant.

Thus, for small voltages induced in rotor winding 198 of resolver 197 the motor 203 displaces the rotor winding 200 from its zero position to balance the voltage from winding 198 and thereby deenergizes the motor 203. When the voltage output of attenuator 185 rises above the small or null voltage always present, the potentiometer 201 no longer is able to balance the output of rotor winding 198 so that motor 203 is energized and tends to run at full speed. The resulting output voltage of generator 207, proportional to the magnitude of the output voltage of rotor winding 198, is applied to the primary winding 205 of transformer 136 so that a voltage is induced in secondary windings 135 and 204. The voltage output of secondary winding 135 $eDN$ decreases the voltage applied to the stator winding 134, whence the shaft 145 is driven at a slower speed until eventually the motor 184 is able to keep up with the modified $$cR\frac{dB}{dt}$$

voltage at rotor winding 138. It should be noted that a similar circuit is energized by the rotor winding 199 to produce the $eDE$ voltage in secondary winding 132. After some time the motor 184 can drive the rotor winding 182 at a speed greater than the modified speed of shaft 145 so that the voltage energizing winding 196 begins to decrease and approach zero. Then, the output of rotor winding 200 energizes the motor 203 so that the motor 203 begins to drive shaft 209 in the opposite direction and the voltage applied to stator winding 134 increases above the $Srn$ voltage from resolvers 36 and 60 so that the voltage in rotor winding 138 of resolver 131 increases and motor 144 drives shaft 145 at an increased speed which is higher than the actual bearing rate would indicate. Motor 204 continues to run until the intermittent drive 208 causes the rotor winding 200 to be driven toward the zero position so that motor 204 is deenergized and the $eD_N$ voltage becomes zero.

It can be seen that the total displacement of shaft 209 from zero is proportional to the total error north due to incorrect generation, and that in driving the shaft 209 back to the zero position the position keeper corrects the error so introduced.

The remaining primary winding 210 of resolver 197 is energized by the voltage applied to control field winding 142 of motor 103, and in the event that the range generation by motor 103 cannot keep up with the $cdR$ signal of rotor winding 137 correction signals are again produced in the transformers 136 and 133 in a manner similar to that just described.

Range and bearing may be manually inserted by means shown in Fig. 3 for the range circuit. The crank 215 is urged to the left to close switch 216 and to engage the driving gears 217. Closure of switch 216 energizes relay winding 218 from power supply 216' thereby causing actuation of the switches 124, 114 and 93 to the right in Fig. 3 to effect the following:

Brake winding 120 is deenergized by switch 124 to free shaft 97, brake winding 112 is energized by switch 114 through switch 119 to lock shaft 100 and switch 93 short circuits the output of amplifier 79 to remove the signal output of amplifier 79 from the motor 91. Therefore, turning the crank 215 causes rotation of shaft 97 through the gearing 217, 219 and by means of differential 99 allows rotation of shaft 104 to the desired setting of range as read on the dial 104'.

We claim:

1. In a device for continuously determining the position a of moving target vessel, means adapted to receive continuous indications of speed, course and course curvature of the target vessel, speed and course of own ship and intermittent indications of true range and relative bearing of the target, said means combining the inputs of speed, course and curvature to provide rectangular coordinates of relative speed and direction of target and means for transforming said coordinates to another set of rectangular axes indicative of time rate of change of range and bearing, first integrating means for determining the change in range from said indicated time rate of change of range, means for adding the change in range to the initial range, a second integrating means having the output of said adding means applied thereto, motor means for driving said second integrating means, a third integrating means for integrating said indicated time rate of change of bearing, means for comparing the outputs of said second and third integrating means and means for energizing said motor means according to the difference in the outputs of said second and third integrating means, means for adding the output of said motor means to an initial bearing value, the said transforming means being controlled according to the sum thereof, means for adding own course to said sum, second comparing means for comparing the total of said own course and sum with the input relative bearing and means for adjusting the initial bearing value according to the output of said second comparing means.

2. In a device for continuously determining the position of a moving target vessel, means adapted to receive continuous indications of speed, course and course curvature of the target vessel, speed and course of own ship and intermittent indications of true range and relative bearing of the target, said means combining the inputs of speed, course and curvature to provide rectangular coordinates of relative speed and direction of target and resolver means for transforming said coordinates to another set of rectangular axes indicative of time rate of change of range and bearing, first integrating means for determining the change in range from said indicated time rate of change of range, means for adding the change in range to the initial range, a second integrating means having the output of said adding means applied thereto, motor means for driving said second integrating means, a third integrating means for integrating said indicated time rate of change of bearing, means for comparing the outputs of said second and third integrating means and means for energizing said motor means according to the difference in the outputs of said second and third integrating means, means for adding the output of said motor means to an initial bearing value, the said resolver means being controlled according to the sum thereof, means for adding own course to said sum, second comparing means for comparing the total of said own course and sum with the input relative bearing and means for adjusting the initial bearing value according to the output of said second comparing means.

3. In an ordnance calculating device for continuously determining the position of a moving target vessel, means adapted to receive continuous indications of speed, course and course curvature of the target vessel, speed and course of own ship and intermittent indications of true range and relative bearing of the target, said means combining the inputs of speed, course and curvature to provide rectangular coordinates of relative speed and direction of target and means for transforming said coordinates to another set of rectangular axes indicative of time rate of change of range and bearing, first integrating means for determining the change in range from said indicated time rate of change of range, means for adding the change in range to the initial range, a second integrating means having the output of said adding means applied thereto, motor means for driving said second integrating means, a third integrating means for integrating said indicated time rate of change of bearing, means for comparing the outputs of said second and third integrating means and means for energizing said motor means according to the difference in the outputs of said second and third integrating means, means for adding the output of said motor means to an initial bearing value, the said transforming means being controlled according to the sum thereof, means for adding own course to said sum, second comparing means for comparing the total of said own course and sum with the input relative bearing and means for adjusting the initial bearing value according to the output of said second comparing means.

4. In an ordnance calculating device for continuously determining the position of a moving target vessel, means adapted to receive continuous indications of speed, course and course curvature of the target vessel, speed and course of own ship and intermittent indications of true range and relative bearing of the target, said means combining the inputs of speed, course and curvature to provide rectangular coordinates of relative speed and direction of target and resolver means for transforming said coordinates to another set of rectangular axes indicative of time rate of change of range and bearing, first integrating means for determining the change in range from said indicated time rate of change of range, means for adding the change in range to the initial range, a second integrating means having the output of said adding means applied thereto, motor means for driving said second integrating means, a third integrating means for integrating said indicated time rate of change of bearing, means for comparing the outputs of said second and third integrating means and means for energizing said motor means according to the difference in the outputs of said second and third integrating means, means for adding the output of said motor means to an initial bearing value, the said resolver means being controlled according to the sum thereof, means for adding own course to said sum, second comparing means for comparing the total of said own course and sum with the input relative bearing and means for adjusting the initial bearing value according to the output of said second comparing means.

References Cited in the file of this patent

UNITED STATES PATENTS

| | | |
|---|---|---|
| 2,412,443 | Crooke | Dec. 10, 1946 |
| 2,476,746 | Libman | July 19, 1949 |
| 2,600,159 | Ergen | June 10, 1952 |